(12) United States Patent
Manickam et al.

(10) Patent No.: US 8,341,104 B2
(45) Date of Patent: Dec. 25, 2012

(54) METHOD AND APPARATUS FOR RULE-BASED MASKING OF DATA

(75) Inventors: S. A. Vetha Manickam, Chennai (IN); S. Ramanjaneyulu Padegal, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 702 days.

(21) Appl. No.: 11/839,802

(22) Filed: Aug. 16, 2007

(65) Prior Publication Data
US 2009/0048997 A1 Feb. 19, 2009

(51) Int. Cl.
*G06F 17/00* (2006.01)
*G06N 5/02* (2006.01)
(52) U.S. Cl. ......................................... 706/47
(58) Field of Classification Search .............. 706/47; 707/757
See application file for complete search history.

(56) References Cited

U.S. PATENT DOCUMENTS

| | | | |
|---|---|---|---|
| 4,135,240 A * | 1/1979 | Ritchie | 711/164 |
| 6,941,355 B1 * | 9/2005 | Donaghey et al. | 709/220 |
| 7,062,500 B1 * | 6/2006 | Hall et al. | 1/1 |
| 2002/0104015 A1 * | 8/2002 | Barzilai et al. | 713/201 |
| 2004/0054898 A1 * | 3/2004 | Chao et al. | 713/168 |
| 2006/0031592 A1 * | 2/2006 | Hinton et al. | 709/250 |
| 2006/0074897 A1 * | 4/2006 | Fergusson | 707/4 |
| 2006/0218149 A1 * | 9/2006 | Patrick | 707/9 |
| 2006/0242150 A1 * | 10/2006 | Jogand-Coulomb et al. | 707/8 |
| 2006/0277184 A1 * | 12/2006 | Faitelson et al. | 707/9 |
| 2007/0110224 A1 * | 5/2007 | Gumpel et al. | 380/28 |
| 2007/0136237 A1 * | 6/2007 | Barker et al. | 707/2 |
| 2007/0250185 A1 * | 10/2007 | Laye et al. | 700/32 |

OTHER PUBLICATIONS

M. Hicks et al., "A Secure Plan", IEEE Trans. on Systems, Man, and Cybernetics, vol. 33, No. 3, Aug. 2003, pp. 413-426.*

* cited by examiner

*Primary Examiner* — Kakali Chaki
*Assistant Examiner* — Vincent Gonzales

(57) ABSTRACT

An approach is provided for de-personalizing data. Content from a data source is retrieved in response to a request by a user. A rule for masking data (e.g., web data) is determined, wherein the rule is specified in a policy associated with the user. A search, within the content, for data that satisfy the rule is performed. The data that satisfy the rule is masked. The content is then modified with the masked data for delivery to the user.

26 Claims, 13 Drawing Sheets

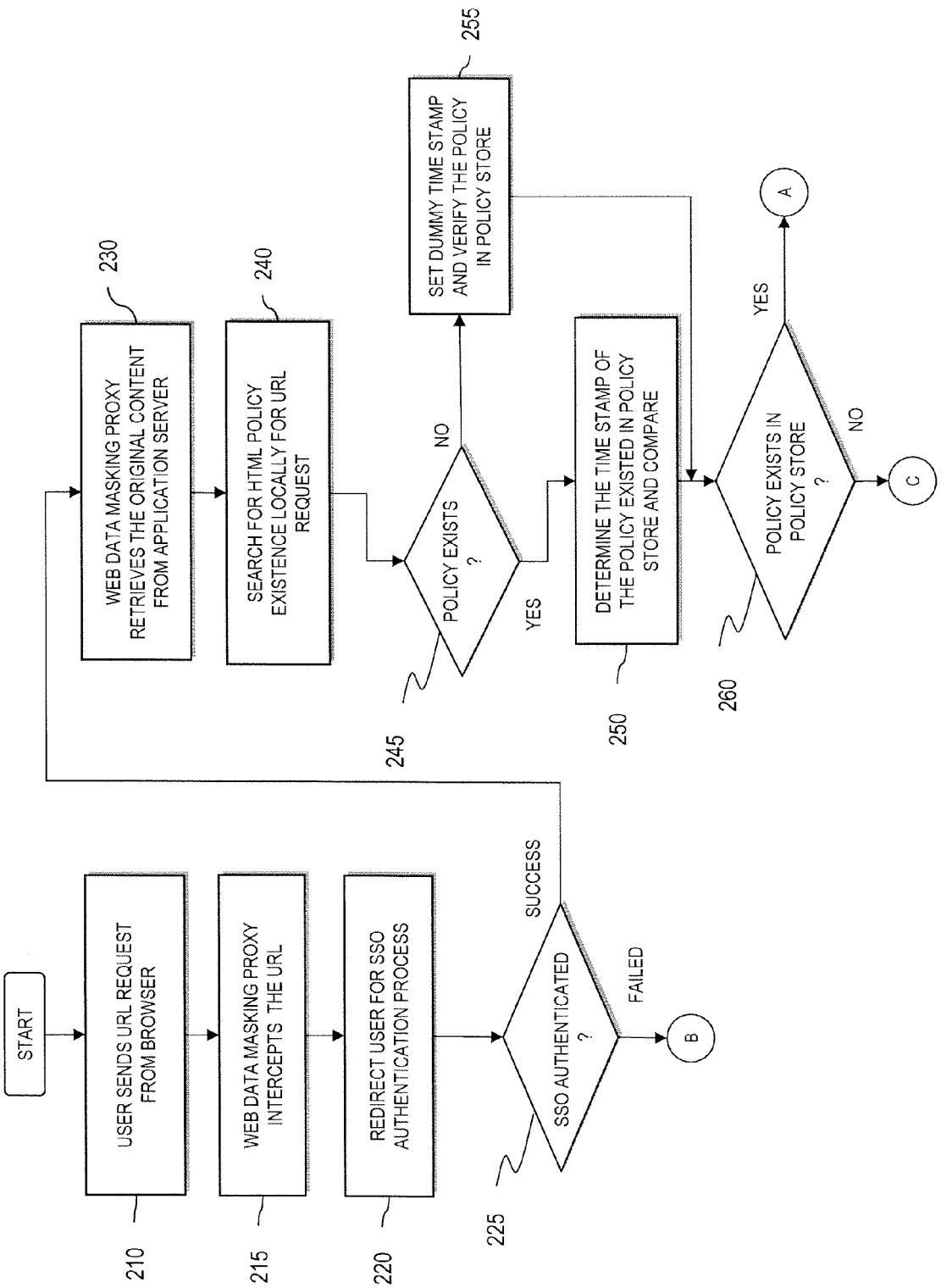

US 8,341,104 B2

METHOD AND APPARATUS FOR RULE-BASED MASKING OF DATA

BACKGROUND OF THE INVENTION

Globalization and innovations in communication systems have changed the manner in which society lives, does work, etc. Information technological revolutions, such as the Internet, have created a virtual world without boundaries; such exemplars include virtual offices, virtual businesses, virtual hospitals, and online trading. Moreover, modern information technology (IT) operations and IT enabled services can become virtual in terms of off shoring and near shoring. Data management and protection play a key role in advancing these services. It is recognized that while in transit from one physical location to another, personal, business, or governmental sensitive data need to be protected.

In fact, data protection is necessary to ensure compliance with various privacy laws mandated by numerous countries. For example, in many jurisdictions, sensitive data is not permitted to enter foreign land. Consequently, data that crosses a foreign boundary needs to be de-personalized or sanitized. De-personalization, if performed effectively, can stimulate more offshore work.

Conventionally, cryptography has been utilized to ensure data protection. Even though classical cryptographic techniques address the concerns of privacy when data is in transit, such techniques do not effectively resolve the handling of data after its decryption. In addition, it is difficult to implement total communication security; such approach is not only costly, but key management is tedious. Further, because data can be accessed through any application (which protects user level authorization), the data can be inadvertently disclosed to an unauthorized end user.

Therefore, there is a need for an approach for de-personalizing data as to accommodate a wide range of applications.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 2A and 2B are a flowchart of a rule-based web data masking process, according to an exemplary embodiment;

DESCRIPTION OF THE PREFERRED EMBODIMENTS

A system, method, and software for masking data are described. In the following description, for the purposes of explanation, numerous specific details are set forth in order to provide a thorough understanding of the present invention. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various exemplary embodiments are described with respect to data masking of website content, it is contemplated that these embodiments have applicability to any mechanisms that de-personalizes data as well as other content.

Figure 1:
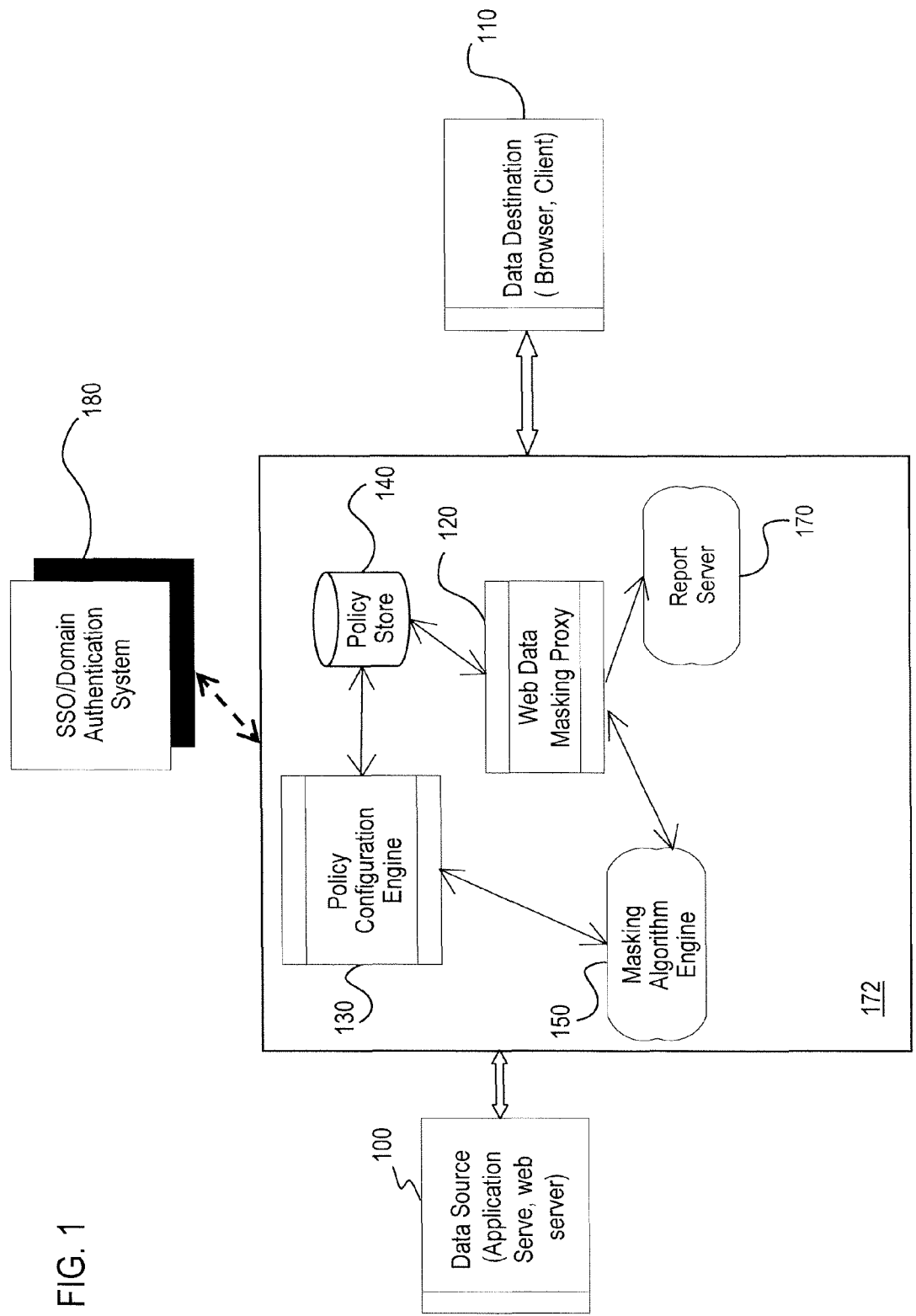
FIG. 1 is a diagram of a system capable of providing data masking, according to an exemplary embodiment.

FIG. 1 is a diagram of a system capable of providing data masking, according to an exemplary embodiment. A data masking architecture is shown in which a data source 100 supplies data to a data destination 110. By way of example, the data source 100 may be an application server or web server or web service or other middleware applications. Also, the data destination 110 can be a browser or a client application or web service or other middleware applications. Whenever the data from the data source 100 is accessed by the data destination 110, the data is de-personalized (or sanitized). In an exemplary embodiment, the data source 100 stores web data, which can include xHTML (hypertext markup language) data, xXML (extended mark-up language) data, data through web service connections, scripts (e.g., Java™ Script, Perl Script, PHP, and etc.), or code base (e.g., CGI (common gateway interface), Applets and ActiveX controls using either hypertext transfer protocol (HTTP) or hypertext transfer protocol secure (HTTPS)).

According to one embodiment, the data masking architecture includes a web data masking proxy 120, a policy configuration engine 130, a policy store 140, a masking algorithm engine 150, and a report server 170. These components constitute a data masking portal 172 for masking the web data while accessing the data source 100. The data masking operation, in an exemplary embodiment, can be performed on-the-fly.

Before these clients can access web data from the source 100, the end user is authenticated against an enterprise wide authentication system 180, such as Single Sign On (SSO) or Windows Domain system. Based on the authentication and user configuration policy (resident within the policy store 140), the web data masking proxy 120 determines whether to mask the data or not.

Policies that are created through the policy configuration engine 130 are stored in the policy store 140. In general, the policy store 140 provides secure storage of sensitive data. The web data masking proxy 120 retrieves and checks the policy from this policy store 140 for updating of such policies. The policy configuration engine 130 permits creation and modification of the policies by the users; this is more fully described in FIGS. 3A and 3B.

Under this architecture, the report server 170 provides for logging of transactions of the portal 172. In an exemplary embodiment, the report server 170 creates and stores logs for debugging and tracing purposes. In this manner, graphical reports and text reports can be generated based on the transactions. This reporting process can be performed on a daily basis to record information about daily transactions.

Data de-personalization/sanitization extends beyond the technical obstacles. As noted previously, such de-personalization of data is mandated by law. The legal requirements for data sanitization vary from country to country. In the United States for example, the Gramm-Leach-Bliley Act requires institutions to protect the confidentiality and integrity of personal consumer information. The Right to Financial Privacy Act of 1978 creates statutory Fourth Amendment protection for financial records and there are a host of individual state laws. There are also a number of security and privacy requirements for personal information included in the Health Insurance Portability and Accountability Act of 1996 (HIPAA).

With the European Union, Directive 95/46/EC of the European Parliament provides strict guidelines regarding individual rights to data privacy and the responsibilities of data holders to guard against misuse. The United Kingdom Data Protection Act of 1998 extends the European Parliament directive and places further statutory obligations on the holders of personal, private or sensitive data.

Thus, any organization that, for example, outsources testing, development, and business processing operations needs to be conscious of the specific laws regulating the transmission of information across national borders. However large, the legal liabilities associated with such violations are, the costs may be trivial in comparison to the losses associated with the catastrophic loss of business confidence that is caused by a large scale privacy breach.

Figure 2B:
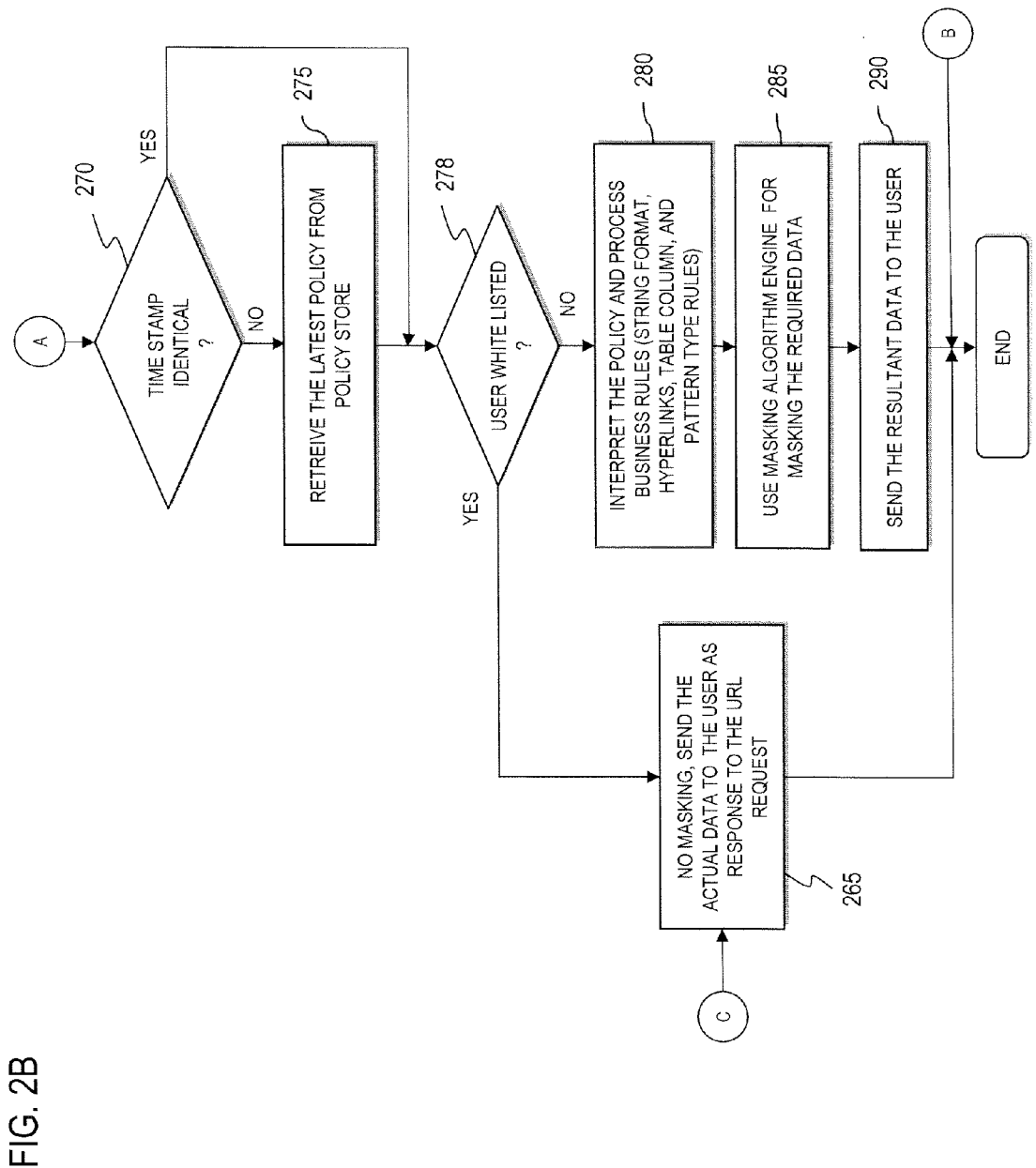

FIGS. 2A and 2B are a flowchart of a rule-based web data masking process, according to an exemplary embodiment. In step 210, the web data masking portal 172 receives a Uniform Resource Locator (URL) request from a corresponding browser or client or web server or web service or other middleware applications as per the data source 100 in the web data masking portal 172. URL requests are the web data requests, which can be using either HTTP or HTTPS protocols. In step 215, web data masking proxy 120 in the portal 172 intercepts the URL request then proceeds to authenticate the user, using for example, Single Sign On (SSO) or Windows Domain system, as in step 220, based on the user inputs. If the determination is in the affirmative, per step 225, the user can invoke action (per step 230); however, if the determination is negative, the work flow ends. In step 230, web data masking proxy 120 retrieves the URL content from its application server. In step 240, web data masking proxy 120 in the portal 172 searches for the policy (e.g., HTML policy) that is available locally. If a policy exists, as determined in step 245, the time stamp of the policy is retrieved and compared, per step 250; otherwise, a "dummy" time stamp is set and the policy in the policy store 140 is verified (step 255).

In step 260, the process searches for existence of the policy in the policy store 140. If such a policy is not found within the policy store, per step 260, no masking is performed, per step 265. Specifically, in step 265, the process passes the data back, without masking, to the user as response to the users URL request. However, if the policy resides within the policy store, the time stamp value is checked (per step 270), as shown in FIG. 2B. Namely, the process verifies the time stamp and retrieves the latest policy from policy store 140 (steps 270 and 275).

Next, the process verifies the user status by determining whether the user is a white-listed user, per step 278. In step 280, if the user is not white-listed, the process interprets the policy and proceeds to apply masking, as in step 285, using the masking algorithm engine 150 in the portal 172. Finally, in step 290, the user receives the resultant data as a response to the URL request.

Figure 3A:
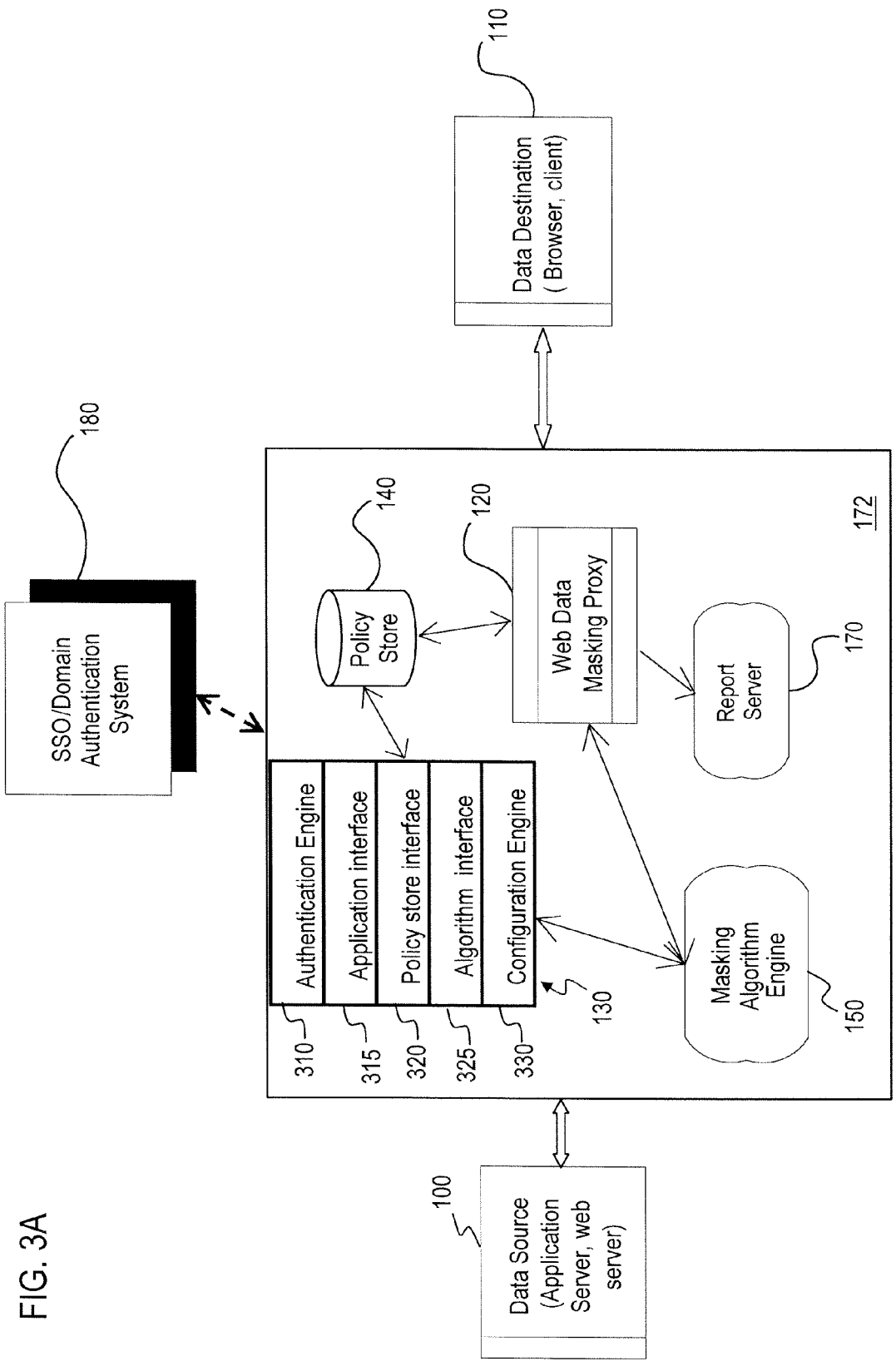
FIGS. 3A and 3B are, respectively, a diagram of a data masking configuration engine of the system of FIG. 1, and a flowchart of a configuration process, according to an exemplary embodiment.
Figure 3B:
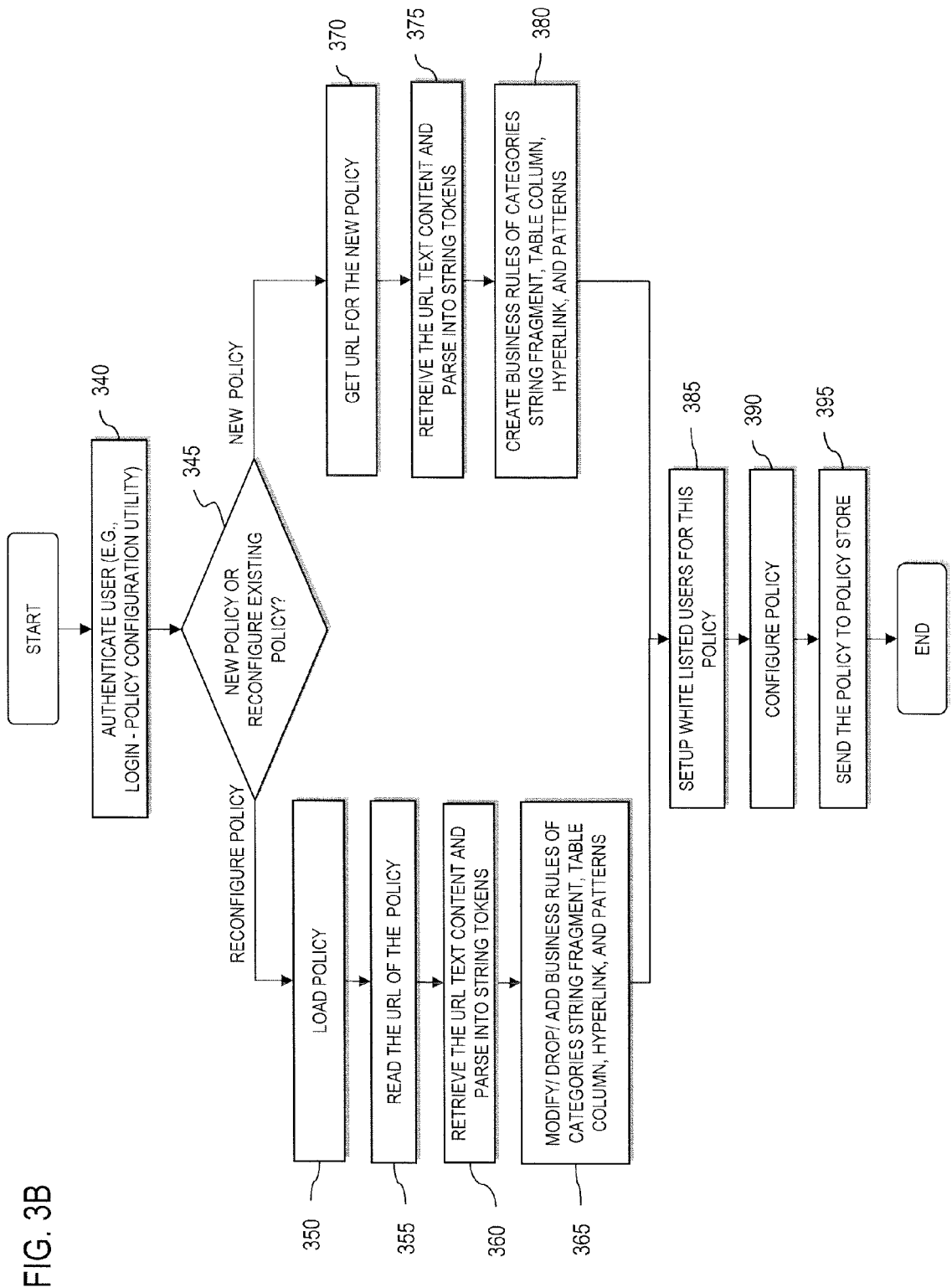

FIGS. 3A and 3B are, respectively, a diagram of a data masking configuration engine of the system of FIG. 1, and a flowchart of a configuration process, according to an exemplary embodiment.

As shown in FIG. 3A, the policy configuration engine 130 permits configuration of policies for applications individually. The policy configuration engine 130 steps the user through a series of input and selection options to specify the configuration. According to an exemplary embodiment, the policy configuration engine 130 can include an authentication engine 310, an application interface 315, a policy store interface 320, an algorithm interface 325, and a configuration engine 330.

This policy configuration engine 130 is authenticated against the SSO/Domain infrastructure 180 so that an authorized user can utilize this policy configuration engine 130. Once authenticated, the user can be provided with a choice to configure a new application or reconfigure existing application, which is obtained from the policy store 140 through the policy store interface 320. During the configuration process, the user can browse available applications through, for instance, inbuilt browser interface, denoted as the application interface 315. Once the applications contents are obtained from the applications, the configuration engine 330 parses through the entire content of the page and lists down all words, individual table, or an individual field to configure as per the legal requirements, for example.

Upon selecting the individual word and table or the parameter from the application, the algorithms available in masking algorithm engine 150 in web data masking portal 172, can be loaded using the algorithm interface 325 for configuration of the masking policy for each application. Once all required parameters or fields required for an application are configured with the respective algorithm and the salt value required for the application or field, the configuration engine 330 can create an extended mark-up language (XML) or hypertext mark-up language (HTML) policy according to each application and stored on the policy store 140. In addition, the user details of those who need the data not to be masked are added in the policy. In this manner, based on the user authentication, the web data masking proxy 120 can decide whether the data is to be masked or not depending on the policy.

The operation of the policy configuration engine 130 in the web data masking portal 172 is illustrated in FIG. 3B. In step 340, the user is authenticated based on the user inputs through, for instance, a login-policy configuration utility. The process, per step 345, determines whether the user seeks to create a new policy or to reconfigure an existing (i.e., already created) policy. If the determination is made to reconfigure a pre-existing policy, then the process loads the policy by retrieving the policy from the policy store 140 (step 350). In step 355, the process reads the URL from the policy content and retrieves the URL content from the application server, parsing the content into string tokens (360). The process also allows the user to modify or remove or add new business rules as part of the policy, per step 365.

If, however, the user wishes to create a new policy (as determined back in step 345), the process obtains the URL, per step 370, for creating the new policy, and then retrieves the URL content. The content is parsed into string tokens, as in step 375. In step 380, user can set up the business rules for applying the masking techniques, then proceeds to step 385.

In step 385, the application owner has the option to configure the list of white-listed users for this application and complete the configuration of the policy (per step 390). The white-listed users can be either individual user-ID (user identifier) or a domain(s), so that the masking can be applied to everyone except the white-listed users. In step 395, the policy is sent to the policy store 140 in the web data masking portal 172.

Figure 4:
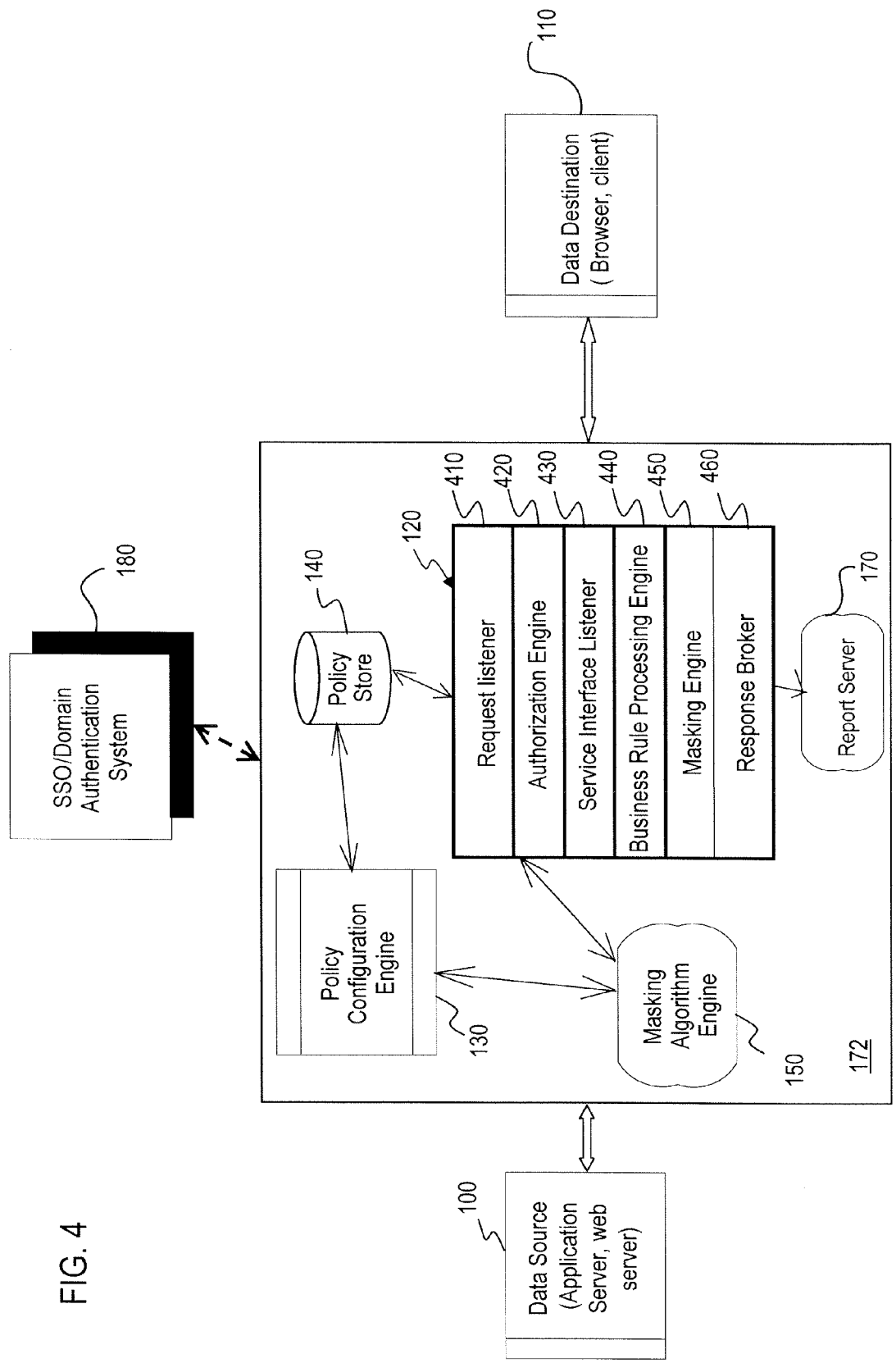
FIG. 4 is a diagram of a web data masking proxy server of the system of FIG. 1, according to an exemplary embodiment.

FIG. 4 is a diagram of a web data masking proxy of the system of FIG. 1, and a flowchart of a data masking process, according to an exemplary embodiment. Any user, who uses a browser or other graphical user interface (GUI), such as a Windows client or any other middleware applications, to connect to an application server or web server through Hyper Text Transfer Protocol (HTTP) or HTTP Secure (HTTPS), can utilize the web data masking proxy 120 to access any of the applications or web server of the data source 100. Hence, the web data masking proxy 120, according to one embodiment, can act as HTTP or HTTPS proxy.

As shown, the web data masking proxy 120, in an exemplary embodiment, includes a request listener 410, an authorization engine 420, a service interface listener 430, a business rule processing engine 440, a masking engine 450, and a response broker 460. The request listener 410 listens to requests and fetches the data from the respective application server for such requests. If the application server is enabled with SSO or Domain authentication process, the server can redirect to get authenticated. Based on the request and the user authentication, the authorization engine 420 authorizes whether the data is to be masked based on the user information, which is specified in, e.g., an HTML policy stored the policy store 140.

According to one embodiment, the web data masking proxy 120 performs a web data masking service based on the request and the user authentication result. For instance, the service interface listener 330 can listen to various services needed with in the request for various data access, load the HTML policy for the respective application, load the appropriate algorithm in the session, perform session maintenance, log the connection information in the reporting servers, etc.

Once the data is retrieved from the respective data source, the business rule processing engine 440 processes the policy and identify the various types of business rules. The engine 440 accordingly calls the appropriate algorithm to the data masking engine 450 to perform the respective masking operation using the algorithm and policy of the respective application to generate the masked data. Once the masking is completed, the masked data is output to the response broker 460, which then renders the resultant data to the respective requesting application.

Figure 5A:
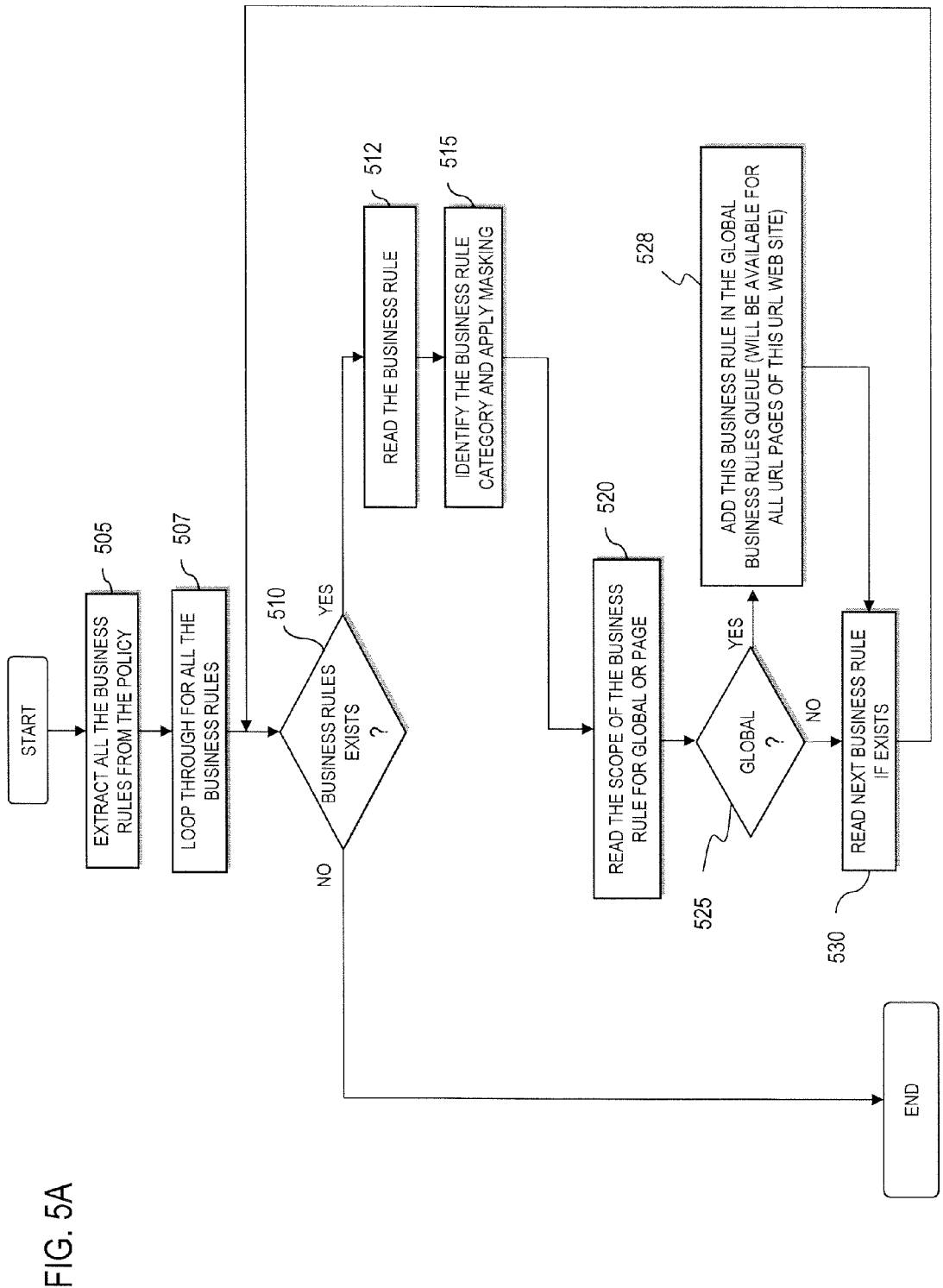
FIGS. 5A and 5B are flowcharts of processes for handling the business rules by a web data masking proxy, according to various exemplary embodiments.
Figure 5B:
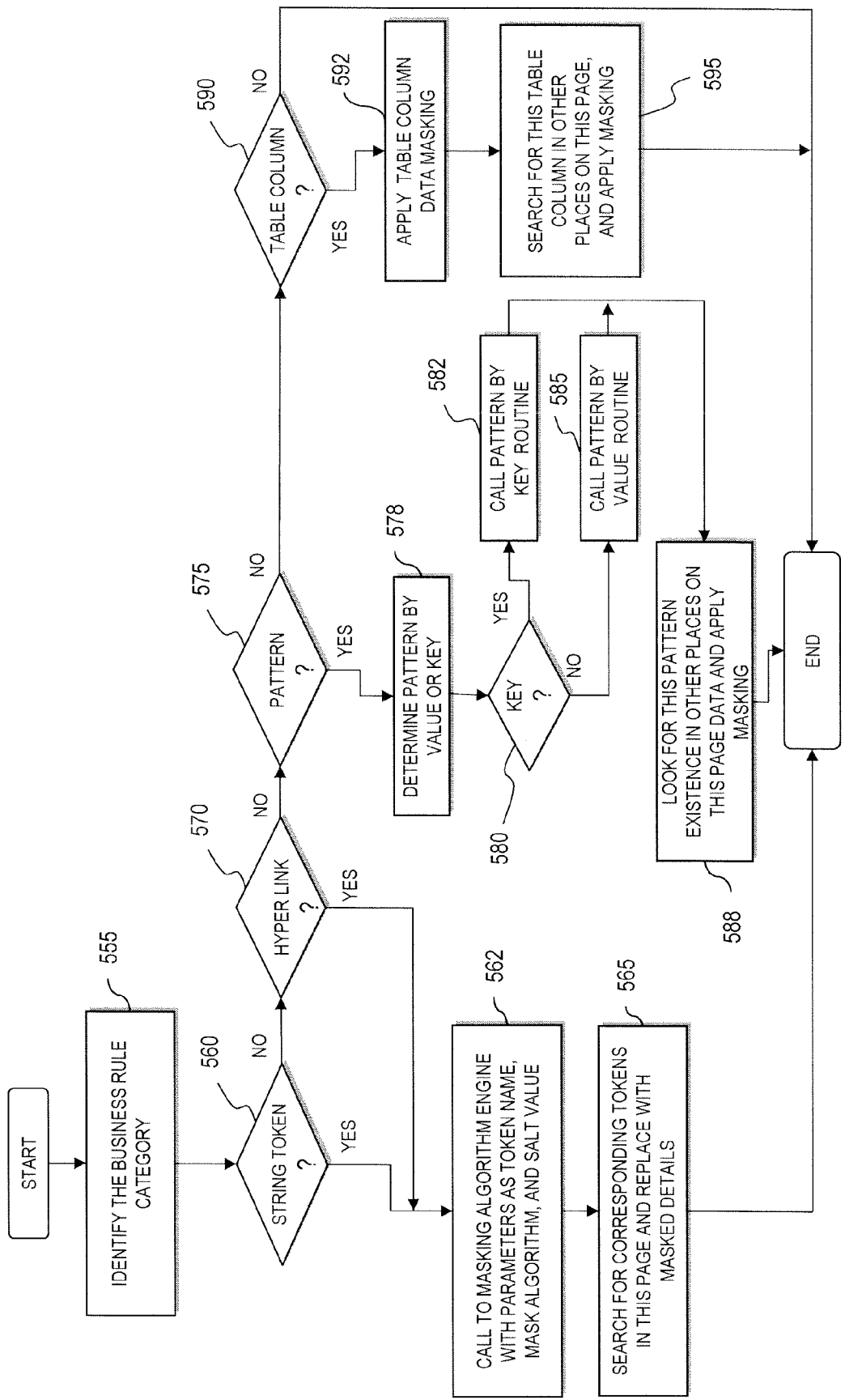

FIGS. 5A and 5B are flowcharts of processes for handling the business rules by a web data masking proxy, according to various exemplary embodiments. These processes are described with respect to the business rule processing engine 440 of the web data masking proxy 120 (FIG. 4). This engine 440 processes the business rules of the HTML policy as follows. As seen in FIG. 5A, the process extracts the existing business rules in the policy and loops through for all the business rules one at a time (per steps 505 and 507). Next, per step 510, the process determines whether a business rule exists, in which the rule has not been processed. If such a rule exists, for the process proceeds to read the next business rule, as in step 512. If no business rule exists, the process ends. In step 515, the business rule category is identified, and masking is applied.

In step 520, the process reads the scope of the business rule and determines whether is the scope is global or limited (e.g., to a page), per step 525. If the scope is determined to be of a global scope, then the business rule is stored in a global queue, per step 528. Otherwise, the process reads the next business rule, per step 530.

FIG. 5B shows the details of the step of identifying the business rule category and application of the masking scheme. In step 555, the process identifies the business rule category; by way of example, these categories include string token, hyperlink, pattern and table column. If the business rule category is determined as string token, as in step 560, then the masking algorithm engine 150 in web data masking portal 172 is called (or invoked) with parameters, such as token name, algorithm name, and salt value. After receiving the masked data from the masking algorithm engine 150, per step 562, the process searches for existence of any other similar string tokens in the page content. If such strings are found, then they are replaced with masked data, as in step 565.

If the business rule category is a hyperlink type business rule, as determined step 570, steps 562 and 565 can be performed with the hyperlink information. That is, after receiving the masked data from masking algorithm engine 150, the process searches for similar hyperlink tokens within the page content; if any hyperlink tokens are found, they are replaced with the masked data.

If the business rule category is a pattern type business rule, as determined in step 575, a search for the pattern type is conducted to further determine whether the pattern is a key pattern or value pattern (steps 578 and 580). Based on this determination, an appropriate call is made. Namely, if a key pattern type is found, the process makes a call to Pattern by Key routine as in step 582; otherwise, the process makes a call to Pattern by Value routine, per step 585. In step 588, the process searches for existence of any other similar pattern tokens in the page content. If such patterns are found, they are replaced with output data. Thereafter the masking process ends. Data masking in the context of patterns are more fully described with respect to FIGS. 6B and 6C.

As shown in FIG. 5B, yet another business rule category is specified—that of a table column type. Specifically, in step 590, the process determines whether the category is a Table column type. If so, data masking is applied to the table column (step 592); this step is further detailed below with respect to FIG. 6A. Next, the process searches for similar tabular column tokens in the page content, per step 595. If it finds any, then it will be replaced with masked data as per step 595 then the process ends.

Although the above processes are described with respect to exemplary categories of string token, hyperlink, pattern, and table column, it is recognized that any content type can be defined (e.g., images, etc.).

Figure 6A:
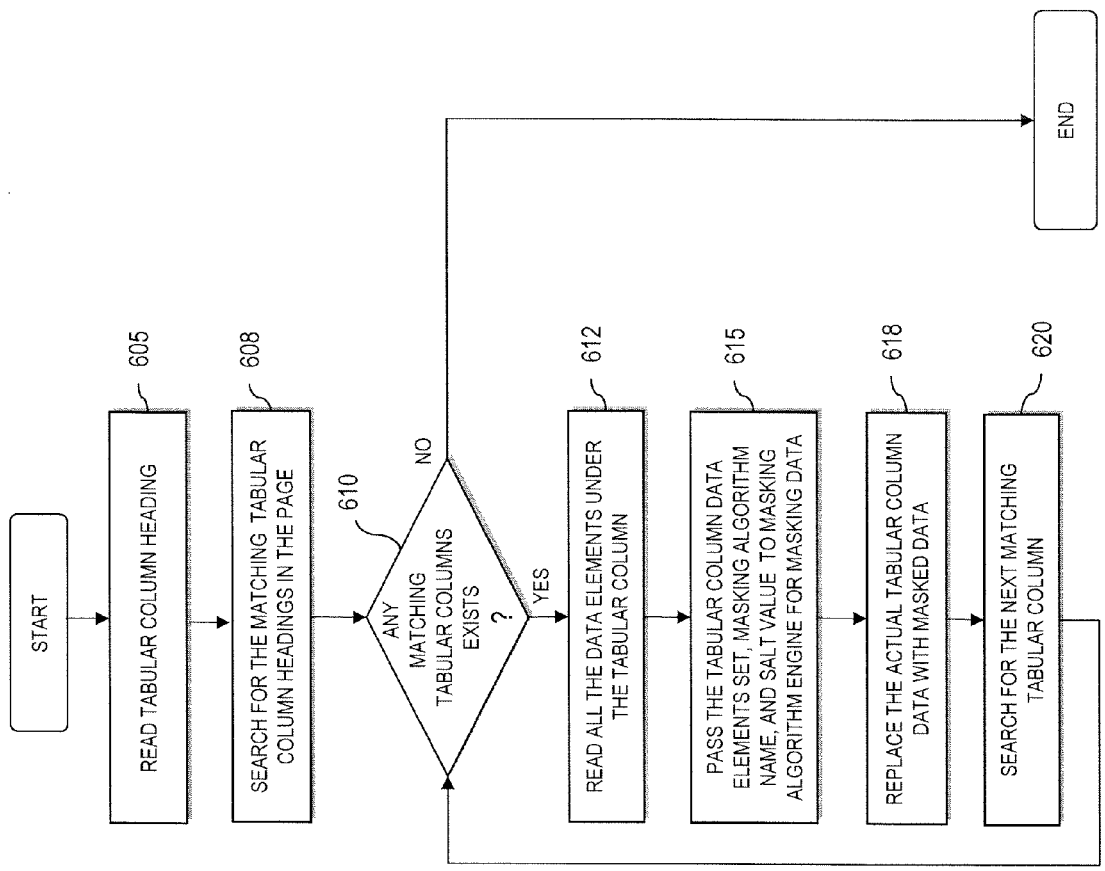
FIGS. 6A-6C are flowcharts for masking with respect to various business rules, according to exemplary embodiments.
Figure 6B:
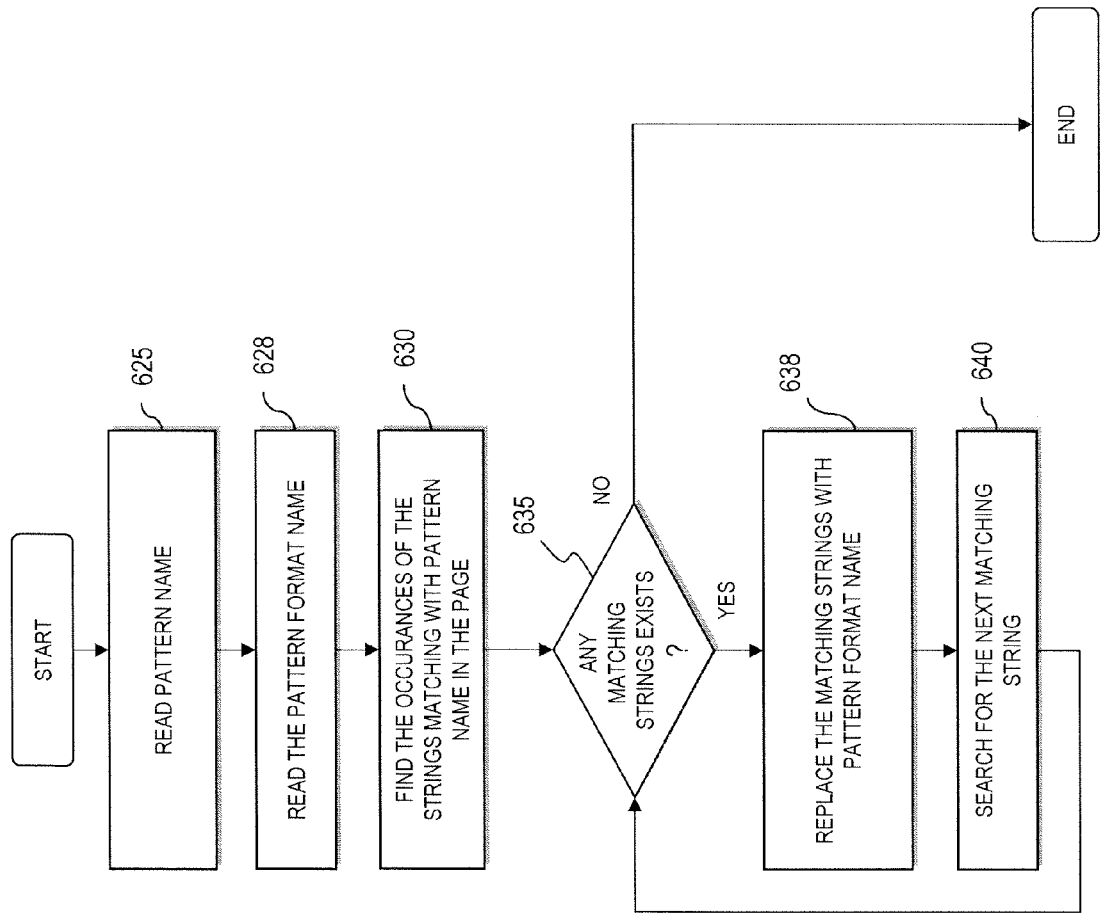
Figure 6C:
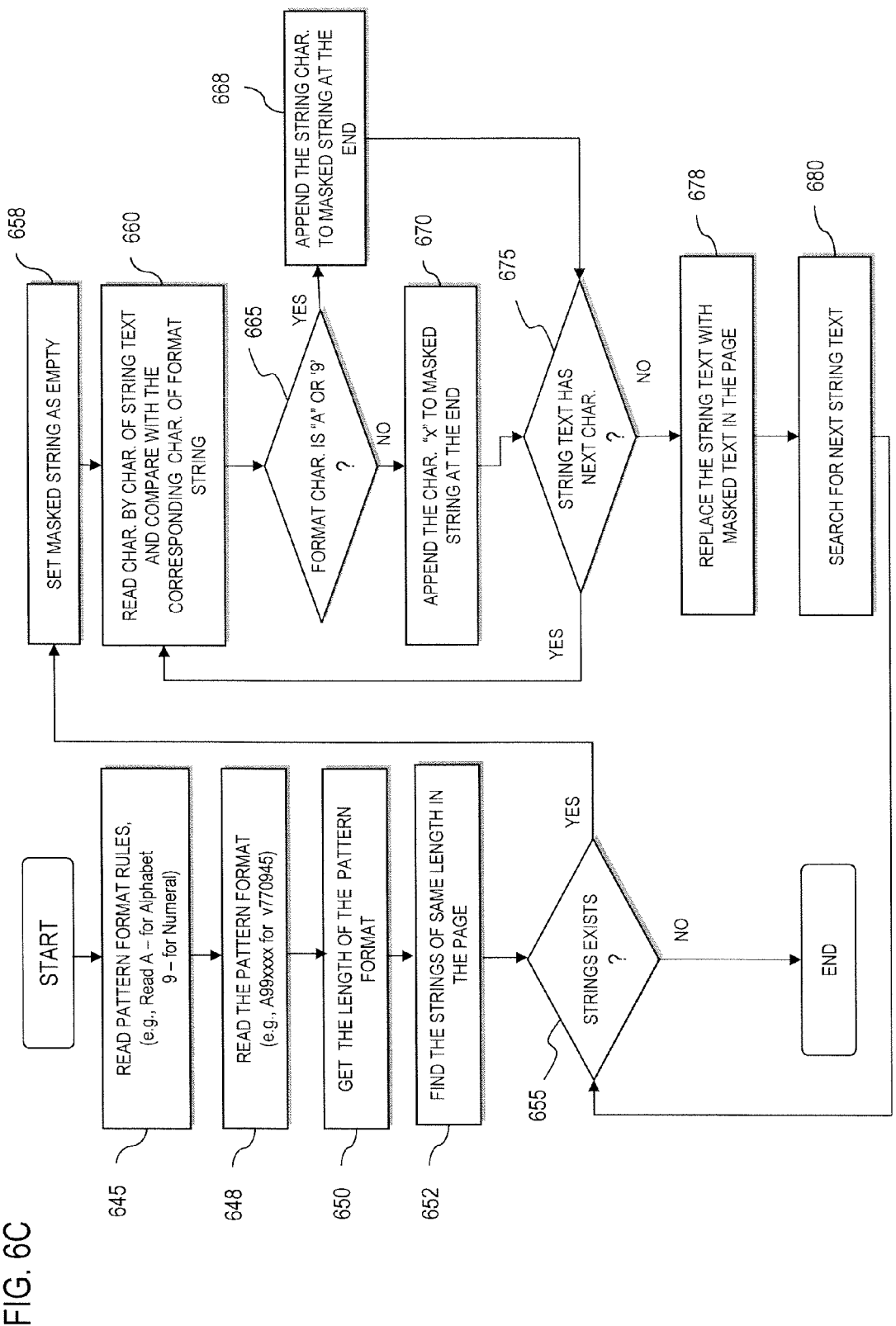

FIGS. 6A-6C are flowcharts for masking with respect to various business rules, according to various exemplary embodiments. As seen in FIG. 6A, in step 605, the process searches for a tabular column heading as well as the matching tabular column data in the page content (step 608). Next, it is determined whether any matching tabular column exists in the page, per step 610. If a match is found, the process reads all the data under the tabular column (step 612) and passes, e.g., table column data elements set, algorithm name, and salt value, to the masking algorithm engine 150 in web data masking portal 172 as parameters (step 615). In step 618, the process replaces the table column data with the masked data. In step 620, the process searches for another tabular column with the same tabular column heading within the page; steps 610-618 are performed for all tabular columns.

Turning back to the pattern type business rule categories, as illustrated in FIG. 6B, the process reads the pattern name and the pattern format as in steps 625 and 628. The process essentially functions as a "find and replace" action. Accordingly, in steps 630-640, matching text with the pattern name is found, resulting in replacement of the matching text with the masked data; the process and loops through for all occurrences. The loop is exited if matching text is not found, in which case, the process ends.

As in the case of masking pattern by key (FIG. 6C), in step 645, the process reads the format rules and stores them in memory for further processing. For example, digit 9 can be used for representing a numeral, and an alphabet "A" is used for representing the alphabet in the original data—e.g., the pattern name 999-99-9999 represents all SSN numbers. In step 648, the pattern format is read for masking; e.g., 999-xx-xxx9 shows the SSN numbers in masked format by blocking the digits from 4-8th digits. Next, in step 650, the process determines the length of the pattern format and finds all the text with the same length in the original data as in the step 652. In step 655, the process checks for existence of any text with the same length as with the pattern format length. If the determination in step 655 is true, then the process goes through cycle of find matching strings from step 658 to step 680.

In step 658, the process initializes the masked text as empty string and then reads the pattern format name character by character, per step 660. If the pattern format character is 9 or A, then the corresponding positional character of the original text gets appended to the masked string as in steps 665 and 668. If the pattern format character is "x," then the corresponding positional character of the original text will not be appended to the masked string, instead the letter "x" is appended (steps 665 and 670). The next character in the string text is examined, per step 675. The steps 665-675 are repeated for all the characters in the pattern format text. In step 678, replacement of the original matching data with the final masked string formed in step 670 is performed. In step 680, the process searches for the next matching text string, and returns to step 655. If the determination in step 655 is false, then the process ends.

Figure 7:
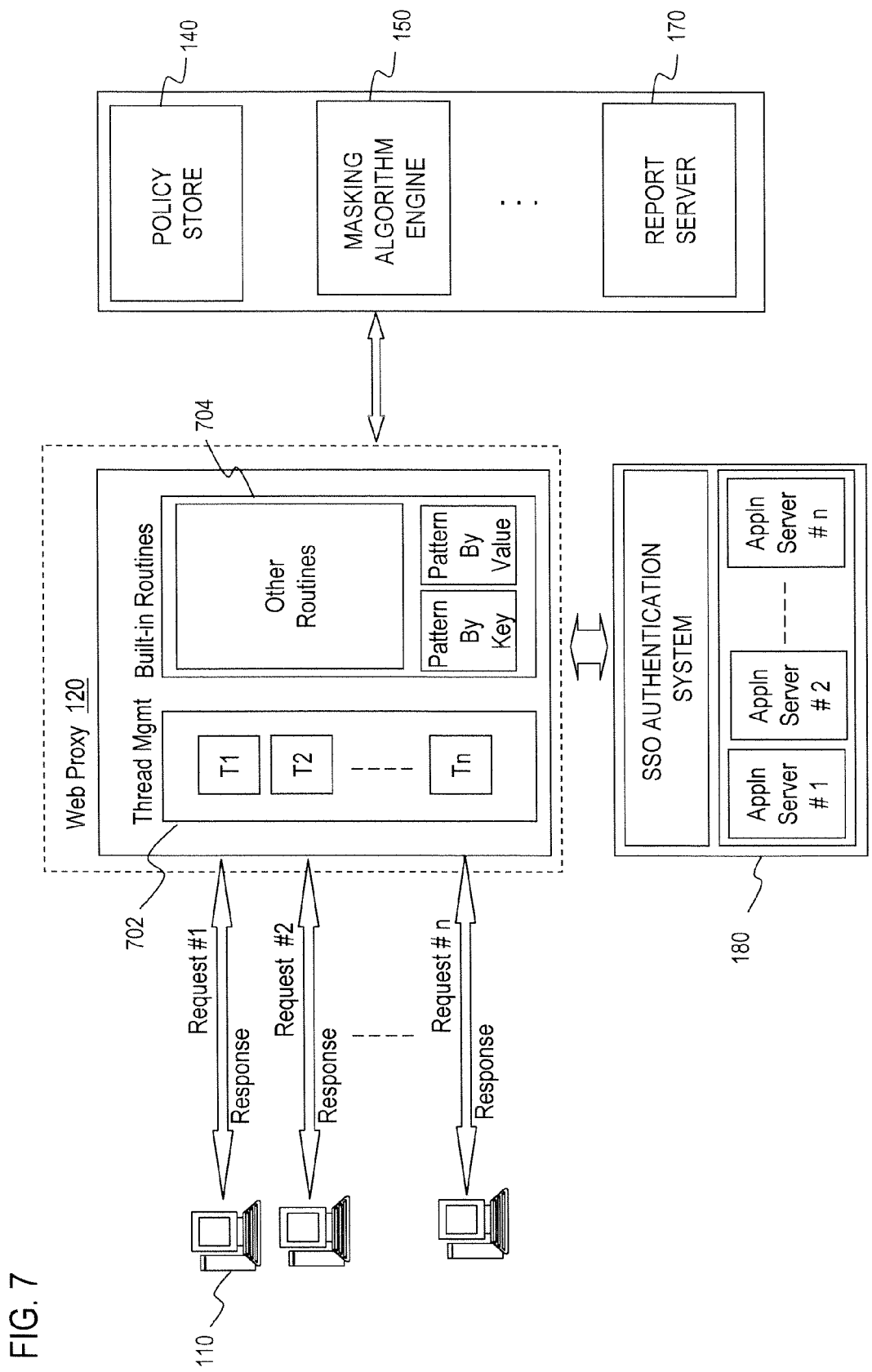
FIG. 7 is a diagram showing the web proxy configured to provide a real-time web data masking process, according to an exemplary embodiment.

FIG. 7 is a diagram showing the web proxy configured to provide a real-time web data masking process, according to an exemplary embodiment. By way of example, the web data masking proxy 120 includes a thread management component 702 and various routines 704 for handling the masking processes associated with different business rule categories.

The web data masking proxy 120 listens to, for example, HTTP/HTTPS requests from disparate clients 110. The thread management component 702 creates an individual thread for each request. These requests are authenticated by the SSO Authentication system 180 externally. The SSO authentication system 180 comprises one or more application servers. As evident from the prior description of the masking processes, the web data masking proxy 120 processes the requests by interacting with such components as the policy store 140, the masking algorithm engine 150, and appropriate application servers. After completion of processing the requests, the responses will be passed back to respective web clients 110.

The above described processes relating to data masking may be implemented via software, hardware (e.g., general processor, DSP chip, an application specific integrated circuit (ASIC), field programmable gate arrays (FPGAs), etc.), firmware, or a combination thereof. Such exemplary hardware for performing the described functions is detailed below.

Figure 8:
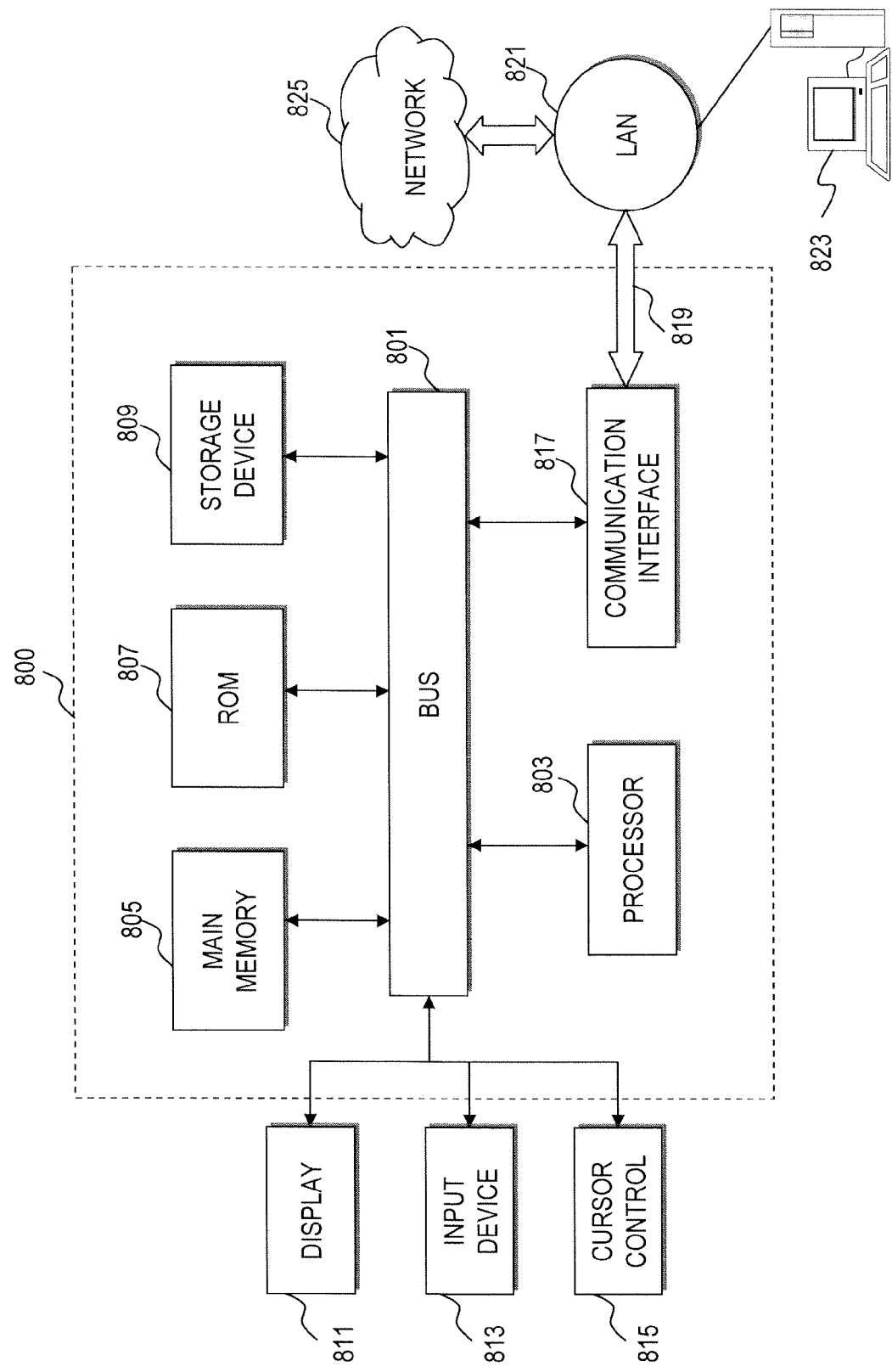
FIG. 8 is a diagram of a computer system that can be used to implement various exemplary embodiments.

FIG. 8 illustrates a computer system 800 upon which an embodiment according to an exemplary embodiment can be implemented. For example, the processes described herein can be implemented using the computer system 800. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment contemplated herein, the processes described are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement certain embodiments. Thus, the exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The following patent applications are incorporated herein by reference in their entireties: co-pending U.S. patent application Ser. No. 11/839,816 filed Aug. 16, 2007 entitled "Method and Apparatus for providing a Data Masking Portal"; and co-pending U.S. patent application Ser. No. 11/839,827 filed Aug. 16, 2007 entitled "Method and System for Masking Data."

What is claimed is:

1. A method comprising;
   authenticating a user against an enterprise wide system;
   retrieving content from a data source in response to a request, wherein the request is submitted from a browser application;
   determining if a policy associated with the user exists locally;
   if the policy does not exist locally, setting a dummy time stamp and comparing the dummy time stamp to a time stamp of the policy within a policy store if the policy exists within the policy store; or, if the policy does exist locally, determining a time stamp of the existing policy and comparing the time stamp of the existing local policy to the time stamp of the policy within a policy store if the policy exists within the policy store,
   the policy including one or more rules for masking data;
   if the policy exists in the policy store, determining whether the either the dummy time stamp or the time stamp of the existing local policy is identical to the time stamp of the policy in the policy store;
   if the time stamps are not identical, retrieving the latest policy from the policy store;
   otherwise using the existing policy;
   searching, within the content, data in accordance with the latest policy, wherein the data satisfy the one or more rules;
   determining whether the user is white-listed;
   if the user is not white-listed, masking the data that satisfy the one or more rules;
   modifying the content with the masked data; and
   if no policy exists in the policy store, or if the user is white-listed, sending the retrieved content from the data source to the browser application without masking the data.

2. A method as recited in claim 1, further comprising:
   determining scope of the one or more rules as specified in the policy, the one or more rules being applied to the content based on the determined scope.

3. A method as recited in claim 2, wherein the data source is a website and the content represents a web page, the scope being either limited to the web page or being global to the website.

4. A method as recited in claim 1, wherein the one or more rules specify at least one of a string token-based rule, a hyperlink-based rule, a pattern value-based rule, a pattern key-based rule, and a table column-based rule.

5. A method as recited in claim 1, wherein the content is formatted according to a HyperText Markup Language (HTML), and the request is submitted from a browser application.

6. A method as recited in claim 5, wherein the data source is web server, the method further comprising:
   intercepting the request destined for the web server.

7. A method according to claim 1, wherein the user modifies the one or more rules or the policy via a policy configuration engine.

8. A method as recited in claim 1, wherein the content is formatted according to an extended markup language (XML), and the request is submitted from a browser application.

9. A method as recited in claim 1, further comprising:
delivering the modified content with the masked data directly to the user.

10. An apparatus comprising:
a processor to authenticate a user against an enterprise wide system;
a request listener configured to receive a request for retrieval of content from a data source, wherein the request is submitted from a browser application;
a policy configuration engine to create a new policy;
a rule processing engine configured to verify a search result for a latest policy associated with the user based on a time stamp value of the policy and configured to determine whether the user is white-listed, the policy includes one or more rules for masking data, the rule processing engine being further configured to search, within the content, data in accordance with the latest policy, wherein the data satisfy the one or more rules; if no policy exists, sending the retrieved content from the data source to the user without masking any content data;
a masking engine configured to mask the data that satisfy the one or more rules; and
a response broker configured to modify the content with the masked data.

11. An apparatus as recited in claim 10, wherein the rule processing engine is further configured to determine scope of the one or more rules as specified in the policy, the one or more rules being applied to the content based on the determined scope.

12. An apparatus as recited in claim 11, wherein the data source is a website and the content represents a web page, the scope being either limited to the web page or being global to the website.

13. An apparatus as recited in claim 10, wherein the one or more rules specify at least one of a string token-based rule, a hyperlink-based rule, a pattern value-based rule, a pattern key-based rule, and a table column-based rule.

14. An apparatus as recited in claim 10, wherein the content is formatted according to a HyperText Markup Language (HTML), and the request is submitted from a browser application.

15. An apparatus as recited in claim 14, wherein the data source is web server, and the request listener is further configured to intercept the request destined for the web server.

16. An apparatus according to claim 10, wherein the user modifies the one or more rules or the policy via a policy configuration engine.

17. An apparatus according to claim 10, wherein the content is formatted according to an extended markup language (XML), and the request is submitted from a browser application.

18. An apparatus as recited in claim 10, wherein the response broker is further configured to deliver the modified content with the masked data directly to the user.

19. A system comprising:
an authentication system to authenticate a user against an enterprise wide system;
a policy store configured to store a policy of the user, the policy relating to data masking; and
a web proxy including,
a request listener configured to receive a request for retrieval of content from a data source, wherein the request is submitted from a browser application;
a policy configuration engine to create a new policy,
a rule processing engine configured to verify a search result for a latest policy associated with a user based on a time stamp value of the policy and configured to determine whether the user is white-listed, the policy including one or more rules for masking data; if no policy exists, sending the retrieved content from the data source to the user without masking any content data;
the rule processing engine being further configured to search, within the content, data in accordance with the latest policy, wherein the data satisfy the one or more rules;
a masking engine configured to mask the data that satisfy the one or more rules; and
a response broker configured to modify the content with the masked data.

20. A system as recited in claim 19, wherein the rule processing engine is further configured to determine scope of the one or more rules as specified in the policy, the one or more rules being applied to the content based on the determined scope.

21. A system as recited in claim 20, wherein the data source is a website and the content represents a web page, the scope being either limited to the web page or being global to the website.

22. A system as recited in claim 19, wherein the one or more rules specify at least one of a string token-based rule, a hyperlink-based rule, a pattern value-based rule, a pattern key-based rule, and a table column-based rule.

23. A system as recited in claim 19, wherein the content is formatted according to a HyperText Markup Language (HTML), and the request is submitted from a browser application.

24. A system as recited in claim 23, wherein the data source is web server, and the request listener is further configured to intercept the request destined for the web server.

25. A system according to claim 19, further comprising:
a policy configuration engine coupled to the policy store and configured to permit the user to modify the one or more rules or the policy.

26. A system as recited in claim 19, wherein the response broker is further configured to deliver the modified content with the masked data directly to the user.

* * * * *

UNITED STATES PATENT AND TRADEMARK OFFICE
CERTIFICATE OF CORRECTION

PATENT NO. : 8,341,104 B2
APPLICATION NO. : 11/839802
DATED : December 25, 2012
INVENTOR(S) : S. A. Vetha Manickam et al.

Page 1 of 1

It is certified that error appears in the above-identified patent and that said Letters Patent is hereby corrected as shown below:

Item [75] of the title page, should read as follows:

-- [75]   Inventors:   S. A. Vetha Manickam, Chennai (IN);
Ramanjaneyulu Padegal, Chennai (IN) --

Signed and Sealed this
Seventh Day of May, 2013

Teresa Stanek Rea
*Acting Director of the United States Patent and Trademark Office*